United States Patent [19]
Ma et al.

[11] Patent Number: 6,160,588
[45] Date of Patent: Dec. 12, 2000

[54] ADAPTIVE ANTI-CROSSCOLOR NOTCH FILTER FOR SECAM ENCODER

[75] Inventors: Xinyu Ma; Regan Myers, both of San Diego; Eric Johnson, Del Mar, all of Calif.

[73] Assignee: Tiernan Communications, Inc., San Diego, Calif.

[21] Appl. No.: 09/176,704

[22] Filed: Oct. 21, 1998

Related U.S. Application Data

[60] Provisional application No. 60/093,515, Jul. 21, 1998.

[51] Int. Cl.$^7$ ................................................. H04N 11/18
[52] U.S. Cl. .......................................... 348/491; 348/624
[58] Field of Search .................................... 348/491, 624, 348/617, 612, 630, 609

[56] References Cited

U.S. PATENT DOCUMENTS

| 4,638,351 | 1/1987 | Clarke | 358/38 |
| 4,638,381 | 1/1987 | Clarke | 358/38 |
| 5,047,841 | 9/1991 | Robinson | 358/31 |
| 5,063,438 | 11/1991 | Faroudja | 358/31 |

FOREIGN PATENT DOCUMENTS

| 411 661 | 3/1990 | European Pat. Off. | H04N 9/64 |
| 030800787 | 5/1991 | Japan | H04N 9/68 |

OTHER PUBLICATIONS

Gold, B., et al., "Theory and Implementation of the Discrete Hilbert Transform," *Proceedings of the Symposium on Computer Processing in Communications*, Edited by Fox, J. Chichester, Sussex UK Wiley–Interscience, pp. 235–250 (1970).

*Primary Examiner*—Victor R. Kostak
*Attorney, Agent, or Firm*—Hamilton, Brook, Smith & Reynolds, PC

[57] ABSTRACT

A luminance notch filter for preventing color crosstalk adaptively attenuates a SECAM luminance signal depending on the strength of the luminance signal using digital filtering techniques. The adaptive luminance notch filter includes a bandpass filter centered at the chrominance band that is operative to receive the input luminance signal and provide a bandpass filtered luminance signal. The bandpass filtered luminance signal is multiplied by a gain factor and the multiplied luminance signal is subtracted from the input luminancee signal to provide a notch filtered luminance signal. A detector coupled to the bandpass filter output detects the signal strength of the bandpass filtered luminance signal and the gain factor is adapted in accordance with the detected signal strength. The bandpass filter comprises an infinite impulse response (IIR) filter that is preferably an all-pole IIR filter of at least $3^{rd}$ order.

23 Claims, 7 Drawing Sheets

ADAPTIVE ANTI-CROSSCOLOR NOTCH FILTER FOR SECAM ENCODER

RELATED APPLICATION

This application claims priority to U.S. Provisional Application No. 60/093,515, filed Jul. 21, 1998, the entire teachings of which are incorporated herein by reference.

BACKGROUND OF THE INVENTION

Color television systems encode "luminance" (brightness) and "chrominance" (hue) information signals in a composite television signal. The luminance signal is equal to a sum of weighted intensity values of the primary hues (red, blue, green). A pair of chrominance signals contain color information consisting of the corresponding differences between the intensities of the red and blue and the luminance signal. In the SECAM ("sequential color and memory") standard, the composite signal containing the luminance and chrominance information is provided in frequency modulated form. The composite SECAM signal comprises a luminance signal in one frequency band and sequentially alternating, frequency modulated chrominance signals in an adjacent, partially overlapping frequency band. The luminance spectrum extends from 0 to 6 MHz. The chrominance information modulates a subcarrier having a frequency swing that extends from 3.9 to 4.75 MHz. Interference between the luminance signal and the chrominance signals, a phenomenon known as "color crosstalk", can occur due to the overlapping frequency bands. This color crosstalk can cause receiver error characterized by a scrambled video image at the receiver.

The SECAM standard specifies attenuation of the amplitude of luminance components located in the overlapping part of the luminance spectrum in order to reduce color crosstalk. Such filtering is specified to have a nonlinear response that depends on the amplitude of the luminance signal in the chrominance bandwidth. Known analog notch filters use a classical passive filter with a set of diodes providing the nonlinear response. Another analog approach uses amplitude thresholding in response to repetitive high luminance signal levels to operate an anti-crosstalk trap circuit.

SUMMARY OF THE INVENTION

In modern video equipment, the SECAM encoding is performed directly from the digital video components using integrated DSP techniques, usually in a single chip. In such systems, analog implementations of the notch filter are not favored because the digital video components would need to be converted to analog components, filtered, converted back to digital components, encoded digitally to the SECAM format, and converted again to analog composite video.

The present invention provides a luminance notch filter that uses digital filtering techniques to adaptively attenuate the overlapping part of the luminance signal, that is, in the chrominance signal passband, depending on the strength of the luminance signal. The attenuation is provided over a wide range of luminance signal amplitudes, with severe attenuation (e.g., up to −20 dB) when the luminance signals are relatively strong and mild attenuation for relatively weak luminance signals.

Accordingly, an adaptive luminance notch filter for use in a television transmission system having a source of luminance signals comprises a bandpass filter centered at the chrominance passband that is operative to receive the input luminance signal and provide a bandpass filtered luminance signal. The bandpass filtered luminance signal is multiplied by a gain factor and the multiplied luminance signal is subtracted from the input luminance signal to provide a notch filtered luminance signal reduced in the overlapping part of the signal. A detector coupled to the bandpass filter output detects the signal strength of the bandpass filtered luminance signal and the gain factor is adapted in accordance with the detected signal strength. In the preferred embodiment, the gain factor is adapted from a look-up table having nonlinear gain factor values associated with values of the detected signal strength.

The luminance notch filter further includes a second multiplier for multiplying the notch filter luminance signal by a second gain factor to provide a luminance output signal with the second gain factor adapted in accordance with the detected signal strength such that the luminance filter response is unity at DC level.

According to an aspect of the invention, the bandpass filter comprises an infinite impulse response (IIR) filter that is preferably an all-pole IIR filter of at least $3^{rd}$ order.

According to another aspect of the invention, the detector comprises an envelope detector for detecting the instantaneous envelope of the bandpass filtered luminance signal.

A digital implementation of the adaptive luminance notch filter of the present invention is particularly useful in systems that convert digital source signals, such as MPEG ("Moving Pictures Expert Group") signals, to SECAM standard signals. Accordingly, a SECAM television signal transmission system includes an MPEG decoder, an adaptive luminance notch filter and a SECAM encoder. The MPEG decoder decodes an MPEG video stream to provide a luminance signal and first and second chrominance signals. The adaptive luminance notch filter includes a bandpass filter centered at the chrominance passband that receives the luminance signal and provides a bandpass filtered luminance signal. A multiplier multiplies the bandpass filtered luminance signal by a gain factor and a subtractor subtracts the multiplied luminance signal from the received luminance signal to provide a notch filtered luminance signal. A detector coupled to the bandpass filter output detects the signal strength of the bandpass filtered luminance signal and the gain factor is adapted in accordance with the detected signal strength. The SECAM encoder receives the notch filtered luminance signal and the chrominance signals to encode a SECAM output signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
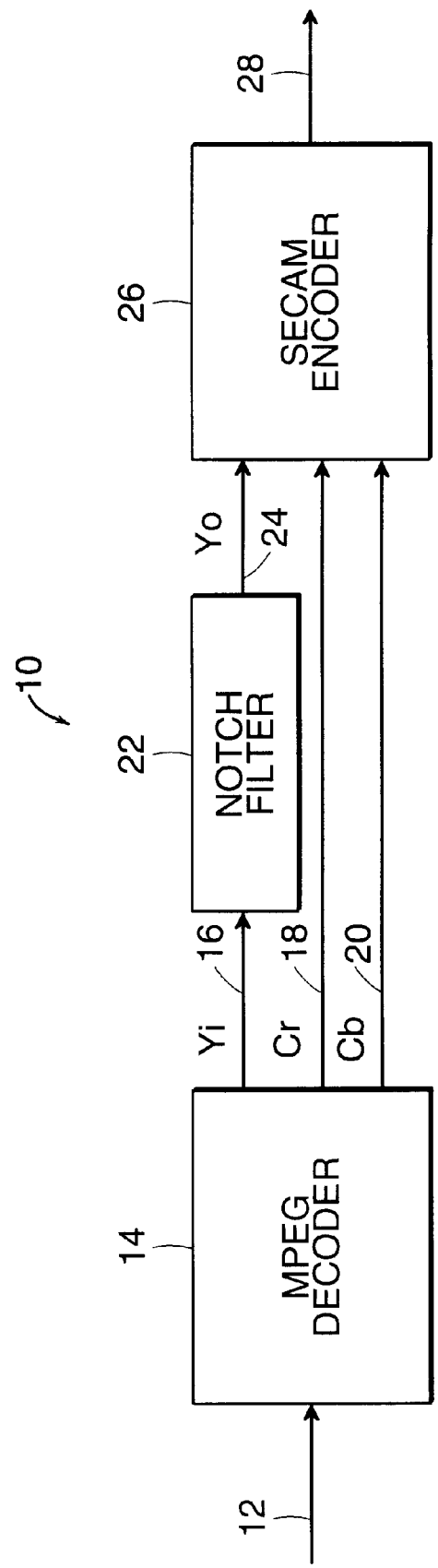
FIG. 1 is a schematic block diagram of a television transmission system in accordance with the present invention.

An exemplary color television transmission system 10 in accordance with the present invention is now described with reference to FIG. 1. The system 10 converts MPEG source signals to SECAM standard signals and includes an MPEG decoder 14, a notch filter 22 and a SECPM encoder 26. The MPEG decoder 14 receives a stream of MPEC video packets on input line 12 and decodes the stream to a digital luminance signal Yi and two digital chrominance signals Cr and Cb on lines 16, 18 and 20 respectively. The luminance signal Yi is processed through the notch filter 22 to provide a filtered luminance signal Yo on line 24. The notch filter 22 attenuates the luminance signal Yo over the chrominance subcarrier frequency band (3.9 to 4.75 MHz) so as to reduce color crosstalk. The attenuation provided by the notch filter 22 is adaptive in accordance with the strength of the luminance signal Yi as described further herein. The filtered luminance signal Yo and the chrominance signals Cr, Cb are supplied to the SECAM encoder 26 which encodes the digital video signals into an analog SECAM video output signal on line 28. The SECAM encoder 26 can be implemented using a Philips Semiconductor model number SAA7182A digital video encoder device.

The digital notch filter of the present invention provides attenuation of the luminance signal that is adaptive based on a wide range of luminance signal amplitudes. The adaptive notch filter 22 is shown in the schematic block diagram of FIG. 2. The filter 22 receives the digital luminance signal Yi in channels 29 and 31. A bandpass filter 30 in channel 29 has a passband $f_0$ centered around 4.3 MHz for passing only luminance signal components Yi' that can cause color crosstalk with components in the overlapping chrominance subcarrier frequency band. A multiplier 50 coupled in series with the bandpass filter 30 multiplies the bandpass filtered luminance signal Yi' by a gain factor g. A subtractor 52 subtracts the bandpass filtered luminance signal Yi' attenuated by gain factor g in channel 29 from the input luminance signal Yi in channel 31 to provide a difference signal 53 having a notch filter characteristic at the passband $f_0$. A multiplier 54 coupled in series with the subtractor 52 multiplies the difference signal 53 by a second gain factor c to provide a notch filtered luminance output signal 24.

In the preferred embodiment, the bandpass filter 30 is implemented as a $3^{rd}$ order all-pole digital IIR filter. The IIR filter 30 includes a feedback tapped delay line with series connected delay elements 44, 46 and 48. The output of each delay element 44, 46, 48 is provided to the input of a corresponding multiplier 38, 40, 42 having a corresponding tap coefficient $a_1$, $a_2$, $a_3$. The outputs of multipliers 40 and 42 are combined in adder 36. The output of adder 36 is combined with the output of multiplier 38 in adder 34. The output of adder 34 is combined with the input luminance signal on line 29 in adder 32 to provide the bandpass filtered luminance signal Yi'.

To obtain a frequency response for the notch filter that meets the SECAM standard, it has been found that the all-pole digital IIR filter should be at least of $3^{rd}$ order. Higher order filters can provide a sharper notch response; however, the $3^{rd}$ order is preferred from a cost perspective.

Figure 2:
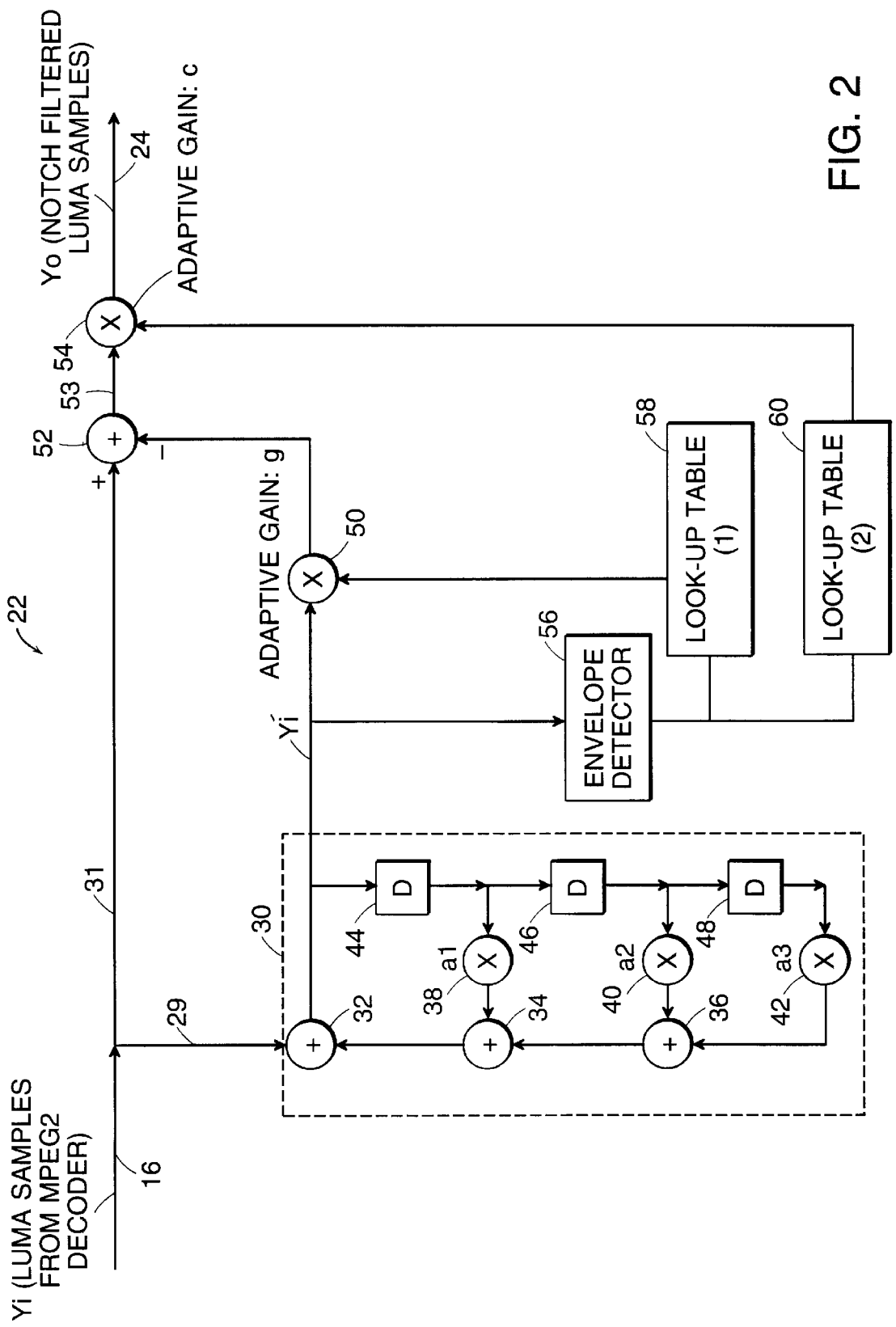
FIG. 2 is a schematic block diagram of an adaptive notch filter for use in the system of FIG. 1.
Figure 3:
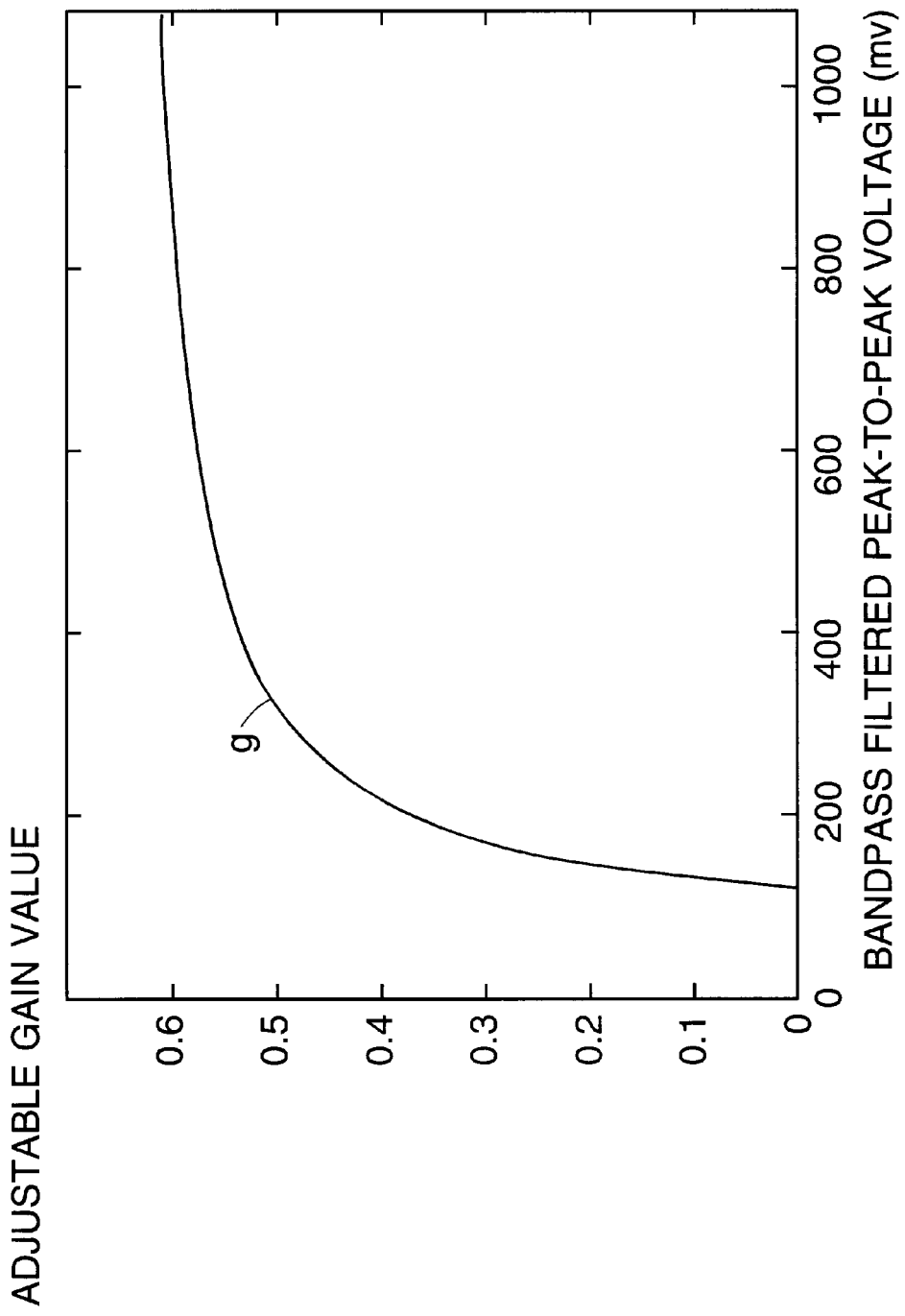
FIG. 3 illustrates the nonlinear characteristic of adjustable gain value versus detected signal strength in the filter of FIG. 2.

The adaptive filtering provided by the present invention is achieved by controlling and adjusting the gain factor g according to the control function shown in FIG. 3. The control function for gain factor g is derived from the SECAM standard so that the attenuation level of the notch filter depends on the luminance signal strength. That is, the attenuation is severe (e.g., up to −20 dB) when the luminance signal is relatively strong; the attenuation is mild when the luminance signal is relatively weak. As shown in FIG. 3, the gain factor g is nonlinear with respect to the peak-to-peak voltage of the bandpass filtered luminance signal Yi' (FIG. 2). As described further herein, the gain factor c is derived from gain factor g.

Referring again to FIG. 2, the notch filter 22 includes an envelope detector circuit 56 for detecting the instantaneous envelope of the bandpass filtered luminance signal Yi'. The detector circuit 56 includes a Hilbert transformer to generate the quadrature component of a real signal so that the instantaneous envelope of the real signal can be readily estimated. The estimated envelope value is then provided to drive a look-up table 58 which contains values for gain factor g that correspond to the control function of FIG. 3. The estimated envelope value also drives a look-up table 60 to provide corresponding values for gain factor c. The adaptive gain factor values g and c from the corresponding look-up tables 58 and 60 are provided to the corresponding multipliers 50 and 54. Thus, the look-up tables function as adapters for adapting the gain factors according to the detected signal strength.

The notch filter 22 has a transfer function that can be expressed in the Z-domain as:

$$H(z) = c(1 - g/(1 - a_1 Z^{-1} - a_2 Z^{-2} - a_3 Z^{-3})) \qquad (1)$$

where g and c are the gain factors and $a_1$, $a_2$ and $a_3$ are the tap coefficients. The feedback loop is fixed with the coefficients given by:

$$a_1 = -0.1663 \equiv -21/128$$

$$a_2 = -0.2473 \equiv -1/4$$

$$a_3 = 0.124 \equiv 1/8$$

Given a value for gain factor g, the gain factor c is obtained from the following:

$$c(1 - g/(1 + 21/128 + 1/4 - 1/8)) \equiv 1 \qquad (2)$$

Thus, at DC level, the overall filter introduces 0 dB gain, i.e., Eq.(1) has $$H(z) = c(1 - g/(1 - a_1 Z^{-1} - a_2 Z^{-2} - a_3 Z^{-3})) \equiv 1$$

when $z = e^{j\omega n}$ with $\omega = 0$.

Figure 4A:
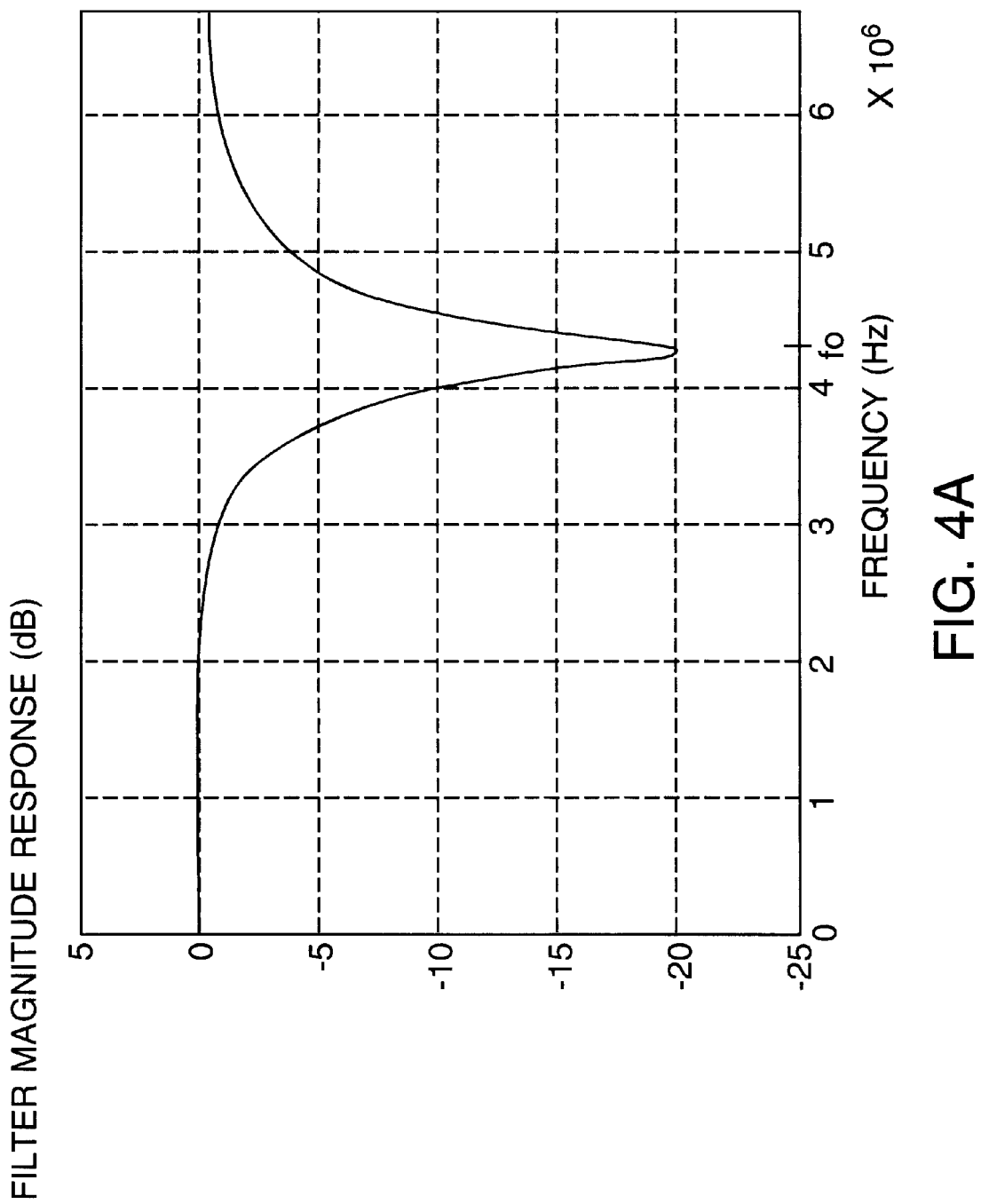
FIGS. 4A and 4B illustrate the respective magnitude and phase response of the filter of FIG. 2 with maximum attenuation.
Figure 4B:
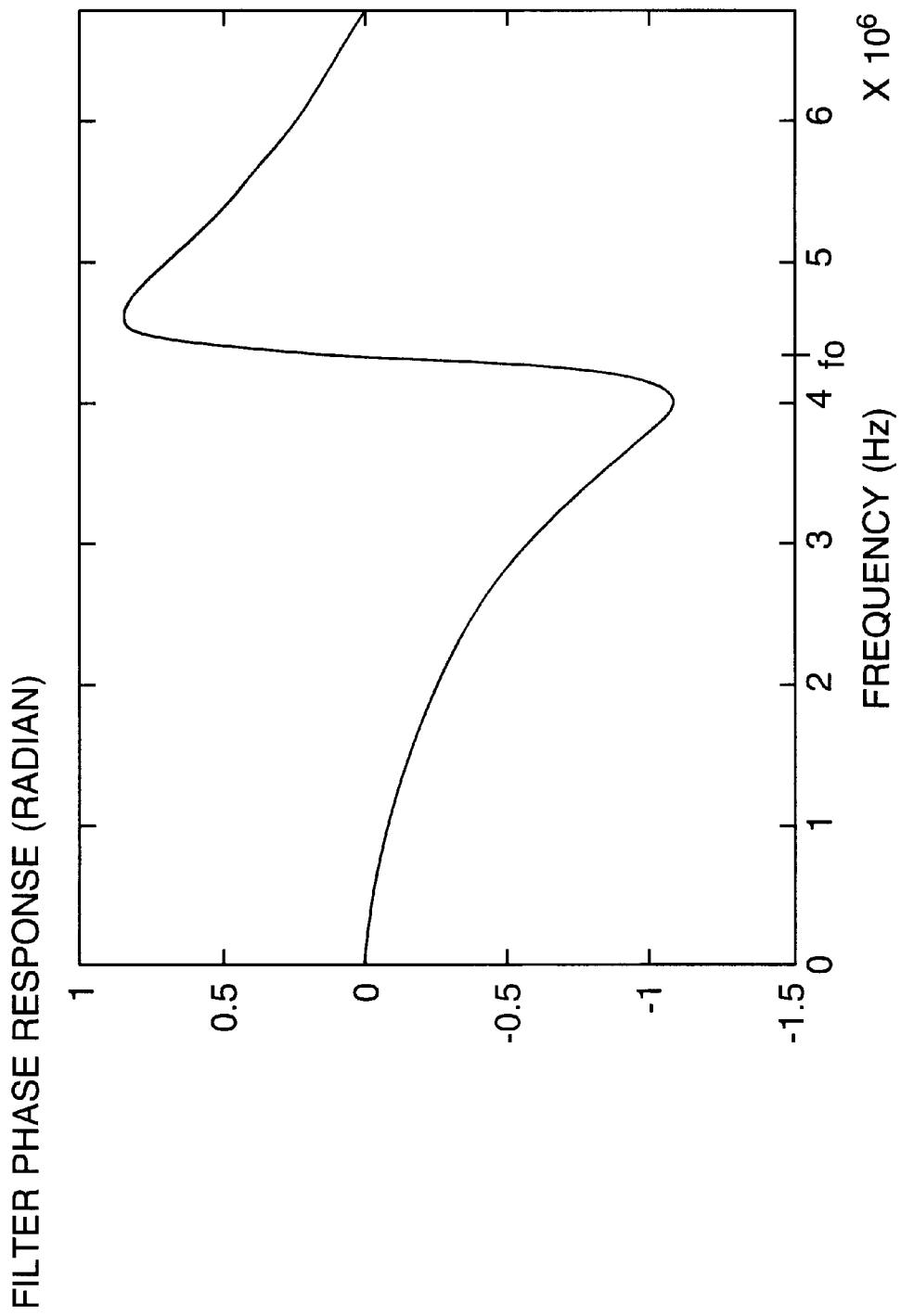

From FIG. 3, at peak-to-peak luminance signal amplitude greater than 700 mv the peak value for gain factor g is equal to 0.61275 which can be approximated as 157/256. From Eq.(2) the corresponding gain factor c is equal to 1.9054 which can be approximated as 61/32. With these tap coefficients and the peak values for g and c, the magnitude and phase frequency response of the adaptive notch filter 22 (FIG. 2) of the present invention are as shown in FIGS. 4A and 4B, respectively. As can be seen from the magnitude response in FIG. 4A, a maximum attenuation of −20 dB is provided at the center frequency $f_0$.

Figure 5A:
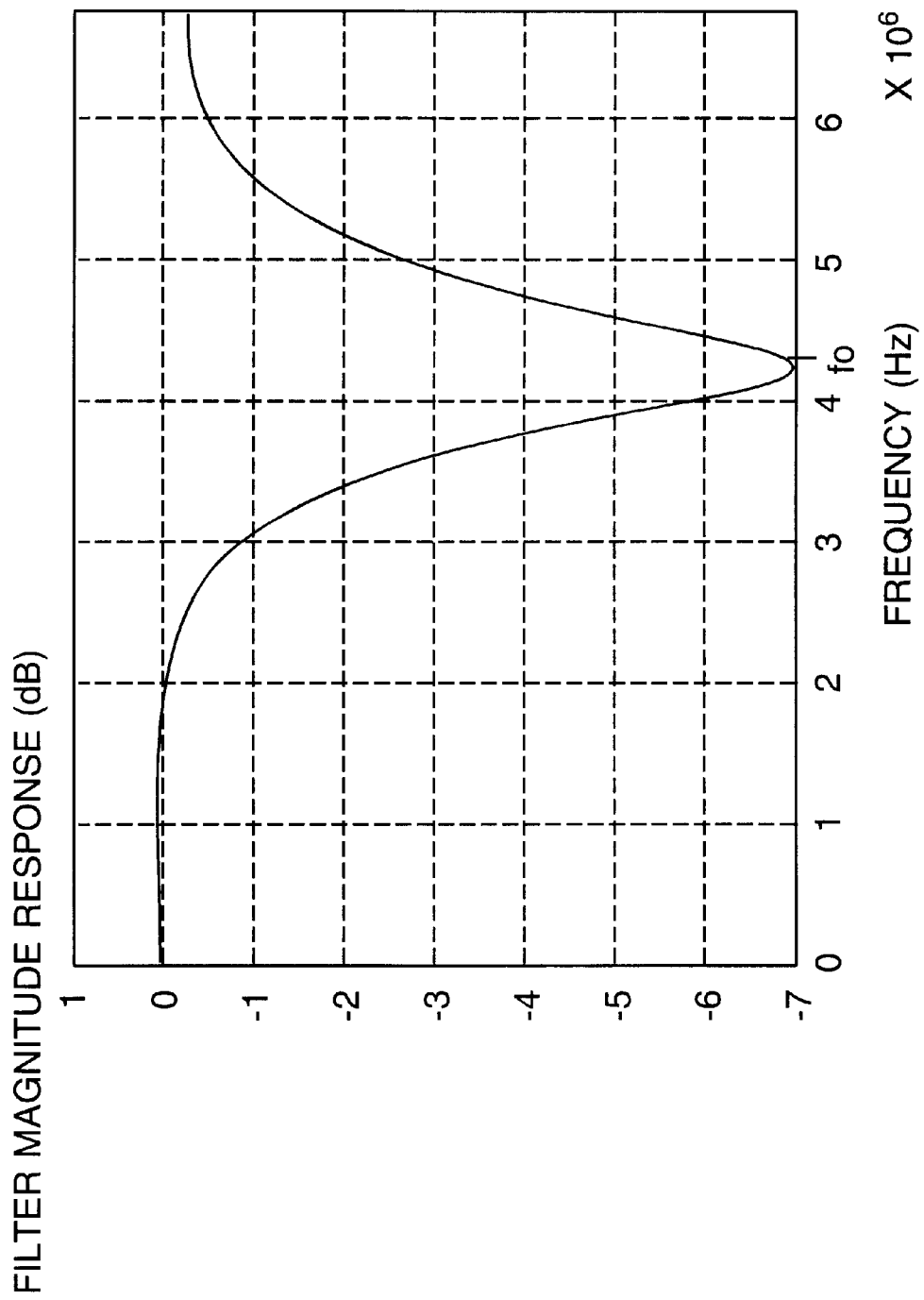
FIGS. 5A and 5B illustrate the respective magnitude and phase response of the filter of FIG. 2 with mild attenuation.
Figure 5B:
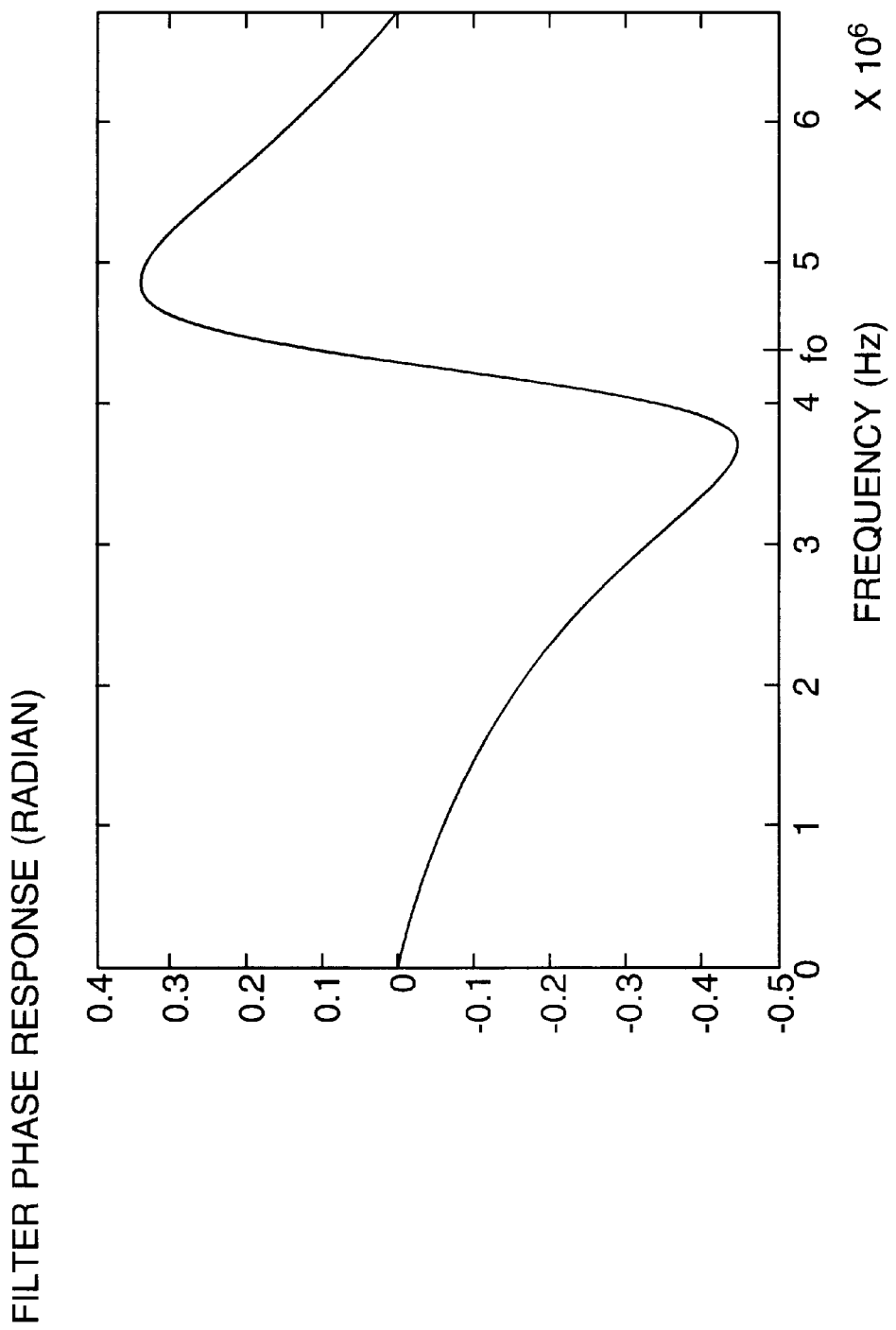

As noted above, the attenuation of the adaptive notch filter is adjusted to the maximum level (−20 dB) only when the peak-to-peak amplitude of the bandpass filtered luminance signal Yi' is above 700 mv. When the luminance signal is relatively weak, the corresponding attenuation provided by the notch filter is mild. For example, when the bandpass filtered luminance signal has only peak-to-peak amplitude of 175 mv, the maximum attenuation of the notch filter is adjusted to −7 dB at the center frequency $f_0$. In this case, gain factor g is equal to 0.46094 (approximated as 118/256) and gain factor c is equal to 1.5625 (approximated as 50/32) and the corresponding magnitude and phase frequency response curves are as shown in FIGS. 5A and 5B, respectively.

It should be noted that when the bandpass filtered luminance signal is below 78.54 mv peak-to-peak, the gain factors g and c are adjusted such that the notch filter functions as an all-pass filter.

In an alternate embodiment, a double differentiator (or detrender) with Z-transform:

$$1/4(1-z^{-1})^2$$

can be inserted between the output of the bandpass filter 30 and the envelope detector 56 (FIG. 2) to mitigate any piece-wise linear trend that may exist at the output of the bandpass filter 30. The output of such double differentiator approximately behaves like a sinusoidal waveform with center frequency around 4.3 MHz which is the notch filter frequency $f_0$.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An adaptive luminance notch filter for use in a SECAM television transmission system having a source of a SECAM luminance signal, the filter comprising:
    a bandpass filter operative to receive the SECAM luminance signal and to provide a bandpass filtered luminance signal;
    a first multiplier for multiplying the bandpass filtered luminance signal by a first gain factor to provide a multiplied luminance signal;
    a subtractor for subtracting the multiplied luminance signal from the luminance signal to provide a notch filtered luminance signal;
    a detector coupled to the bandpass filter output and operative to detect the signal strength of the bandpass filtered luminance signal; and
    a first adapter for adapting the first gain factor in accordance with the detected signal strength.

2. The luminance notch filter of claim 1 wherein the first adapter comprises a look-up table having first gain factor values associated with values of the detected signal strength.

3. An adaptive luminance notch filter for use in a television transmission system having a source of a luminance signal, the filter comprising:
    a bandpass filter operative to receive the luminance signal and to provide a bandpass filtered luminance signal;
    a first multiplier for multiplying the bandpass filtered luminance signal by a first gain factor to provide a multiplied luminance signal;
    a subtractor for subtracting the multiplied luminance signal from the luminance signal to provide a notch filtered luminance signal;
    a detector coupled to the bandpass filter output and operative to detect the signal strength of the bandpass filtered luminance signal;
    a first adapter for adapting the first gain factor in accordance with the detected signal strength; and
    a second multiplier for multiplying the notch filtered luminance signal by a second gain factor to provide a luminance output signal and a second adapter for adapting the second gain factor in accordance with the detected signal strength such that the luminance filter response is unity at DC level.

4. The luminance notch filter of claim 3 wherein the first and second adapters each comprise a look-up table having nonlinear gain factor values associated with values of the detected signal strength.

5. The luminance notch filter of claim 1 wherein the detector comprises an envelope detector for detecting the signal strength from an instantaneous envelope of the bandpass filtered luminance signal.

6. The luminance notch filter of claim 1 wherein the bandpass filter comprises an IIR filter.

7. The luminance notch filter of claim 6 wherein the IIR filter is an all-pole IIR filter of at least $3^{rd}$ order.

8. A SECAM television signal transmission system comprising:
    an MPEG decoder for decoding an MPES video stream to provide a luminance signal and first and second chrominance signals;
    an adaptive luminance notch filter comprising a bandpass filter operative to receive the luminance signal and to provide a bandpass filtered luminance signal;
    a multiplier for multiplying the bandpass filtered luminance signal by a gain factor;
    a subtractor for subtracting the multiplied luminance signal from the luminance signal to provide a notch filtered luminance signal;
    a detector coupled to the bandpass filter output for detecting the signal strength of the bandpass filtered luminance signal; and
    an adapter for adapting the gain factor in accordance with the detected signal strength; and
    a SECAM encoder for receiving the notch filtered luminance signal and the first and second chrominance signals and for encoding a SECAM output signal.

9. The system of claim 8 wherein the adapter comprises a look-up table having gain factor values associated with values of the detected signal strength.

10. The system of claim 8 wherein the adaptive luminance notch filter further comprises a second multiplier for multiplying the notch filtered luminance signal by a second gain factor to provide a luminance output signal and a second adapter for adapting the second gain factor in accordance with the detected signal strength such that the luminance filter response is unity at DC level.

11. The system of claim 10 wherein the first and second adapters each comprise a look-up table having nonlinear gain factor values associated with values of the detected signal strength.

12. The system of claim 8 wherein the bandpass filter comprises an IIR filter.

13. A method for adaptively filtering a SECAM luminance signal, the method comprising:
    bandpass filtering the SECAM luminance signal to provide a bandpass filtered luminance signal having signal components in a preselected frequency spectrum;
    multiplying the bandpass filtered luminance signal by a first gain factor to provide a multiplied luminance signal;
    subtracting the multiplied luminance signal from the luminance signal to provide a notch filtered luminance signal;

detecting the signal strength of the bandpass filtered luminance signal; and adapting the first gain factor in accordance with the detected signal strength.

14. The method of claim 13 wherein the adapting step comprises accessing a look-up table having first gain factor values associated with values of the detected signal strength.

15. A method for adaptively filtering a luminance signal, the method comprising:

bandpass filtering the luminance signal to provide a bandpass filtered luminance signal having signal components in a preselected frequency spectrum;

multiplying the bandpass filtered luminance signal by a first gain factor to provide a multiplied luminance signal;

subtracting the multiplied luminance signal from the luminance signal to provide a notch filtered luminance signal;

detecting the signal strength of the bandpass filtered luminance signal;

adapting the first gain factor in accordance with the detected signal strength; and multiplying the notch filtered luminance signal by a second gain factor to provide a luminance output signal and adapting the second gain factor in accordance with the detected signal strength such that the luminance filter response is unity at DC level.

16. The method of claim 15 wherein the steps of adapting comprise accessing look-up tables having nonlinear gain factor values associated with values of the detected signal strength.

17. The method of claim 13 wherein the detecting step comprises detecting the signal strength from an instantaneous envelope of the bandpass filtered luminance signal.

18. An adaptive luminance notch filter for use in a television transmission system having a source of luminance signal samples, the filter comprising:

a first channel and a second channel, each channel receiving the luminance signal samples;

an IIR filter in the second channel having a bandpass transfer function for providing bandpass filtered luminance samples;

a multiplier for multiplying the bandpass filtered luminance samples by a gain factor;

a subtractor for subtracting the multiplied luminance samples in the second channel from the luminance signal samples in the first channel to provide notch filtered luminance samples;

an envelope detector coupled to the IIR filter output and operative to detect the instantaneous envelope of the bandpass filtered luminance samples; and an adapter for adapting the gain factor in accordance with the detected envelope.

19. The luminance notch filter of claim 18 wherein the adapter comprises a look-up table having nonlinear gain factor values associated with values of the detected envelope.

20. The luminance notch filter of claim 18 wherein the IIR filter is an all-pole IIR filter of at least $3^{rd}$ order.

21. An adaptive luminance notch filter for use in a SECAM television system, the filter comprising:

means for filtering a SECAM luminance signal to provide a bandpass filtered luminance signal having signal components in a preselected frequency spectrum;

first multiplying means for multiplying the bandpass filtered luminance signal by a first gain factor to provide a multiplied luminance signal;

means for subtracting the multiplied luminance signal from the luminance signal to provide a notch filtered luminance signal;

means for detecting the signal strength of the bandpass filtered luminance signal; and first adapting means for adapting the first gain factor in accordance with the detected signal strength.

22. The filter of claim 21 wherein the means for adapting comprises means for accessing a look-up table having first gain factor values associated with values of the detected signal strength.

23. The filter of claim 21 further comprising second multiplying means for multiplying the notch filtered luminance signal by a second gain factor to provide a luminance output signal and second adapting means for adapting the second gain factor in accordance with the detected signal strength such that the luminance filter response is unity at DC level.

* * * * *